United States Patent [19]
Schlueter

[11] 3,734,563
[45] May 22, 1973

[54] DISCHARGE MECHANISM FOR COTTON HARVESTER

[75] Inventor: Francis Edward Schlueter, Des Moines, Iowa

[73] Assignee: Deere & Company, Moline, Ill.

[22] Filed: July 12, 1971

[21] Appl. No.: 161,836

[52] U.S. Cl. .......................... 298/8, 56/30, 294/10
[51] Int. Cl. ................................................ B60p 1/16
[58] Field of Search.......................... 298/1, 8, 10, 27, 298/23 MD; 56/30, 12, 33; 105/240, 209

[56] References Cited

UNITED STATES PATENTS

| | | | |
|---|---|---|---|
| 1,961,193 | 6/1934 | Brumbaugh | 298/23 MD |
| 3,294,371 | 12/1966 | Hubbard | 298/10 |
| 3,606,009 | 9/1971 | Clendenin | 56/30 |

*Primary Examiner*—Richard J. Johnson
*Assistant Examiner*—Reinhard Eisenzopf
*Attorney*—H. Vincent Harsha et al.

[57] ABSTRACT

In a cotton harvester in which green bolls are collected and held in a container by a retractable bottom and the ripe bolls are collected in a basket mounted on a horizontal axis, the improvement residing in hydraulic means for shifting the bottom out of its closed position and for shifting the basket to a tilted position so that material may be discharged from the container and basket respectively. The hydraulic motors for moving the bottom as well as tilting the basket are connected in parallel so that the bottom will be retracted first to its open position and the basket will then be tilted.

4 Claims, 4 Drawing Figures

INVENTOR.
F. E. SCHLUETER

BY William A. Murray
ATTORNEY

000
DISCHARGE MECHANISM FOR COTTON HARVESTER

BACKGROUND OF THE INVENTION

It has heretofore been known to provide cotton harvesters in which both the ripe and green bolls are removed from the plant and the green bolls are collected in a green-boll container and the ripe bolls are blown into a ripe-boll basket. Conventionally, the green bolls are dumped from the container at the end of a row or whenever the container is full, and the ripe-boll basket is tilted so that the ripe bolls will tumble into a truck or wagon positioned alongside the basket.

It is conventional to mount the green-boll container to the rear of the operator's platform so that it can be viewed by the operator. Characteristic of cotton harvesting is the desire to dump the green bolls at the end of a row as well as dumping the ripe bolls into a wagon or trailer at the end of the row. Consequently, it is normally desirable to dump both the green and ripe bolls into their respective discharge areas at the same time. In some instances due to the lack of visibility of the green boll separator, the green-boll container may not be dumped at the end of the row and consequently the container will become full somewhere between the row ends where it will have to be dumped at an undesirable location.

SUMMARY OF THE INVENTION

With the above in mind, it is the primary object of the present invention to incorporate in the cotton harvester having the green-boll container and a ripe-boll basket a hydraulic system for dumping the respective cotton bolls in sequence from the respective container and basket. It is proposed to provide hydraulic motors for operating both dumping operations and to place the hydraulic motors parallel to one another so that a single valve may be utilized for both dumping operations. Also, since the green-boll container is considerably lighter than that of the basket and the basket must be raised, the green-boll container is first dumped so that the green bolls may be discharged prior to the basket being tilted. This becomes important for the reason that should the green-boll container become full or it is desirable to otherwise dump the green-boll container without dumping the ripe-boll basket, the valve may be utilized to dump the container and at the time the basket begins to tilt, the valve may be readjusted so that the basket does not dump.

DESCRIPTION OF THE PREFERRED EMBODIMENT

Figure 1:
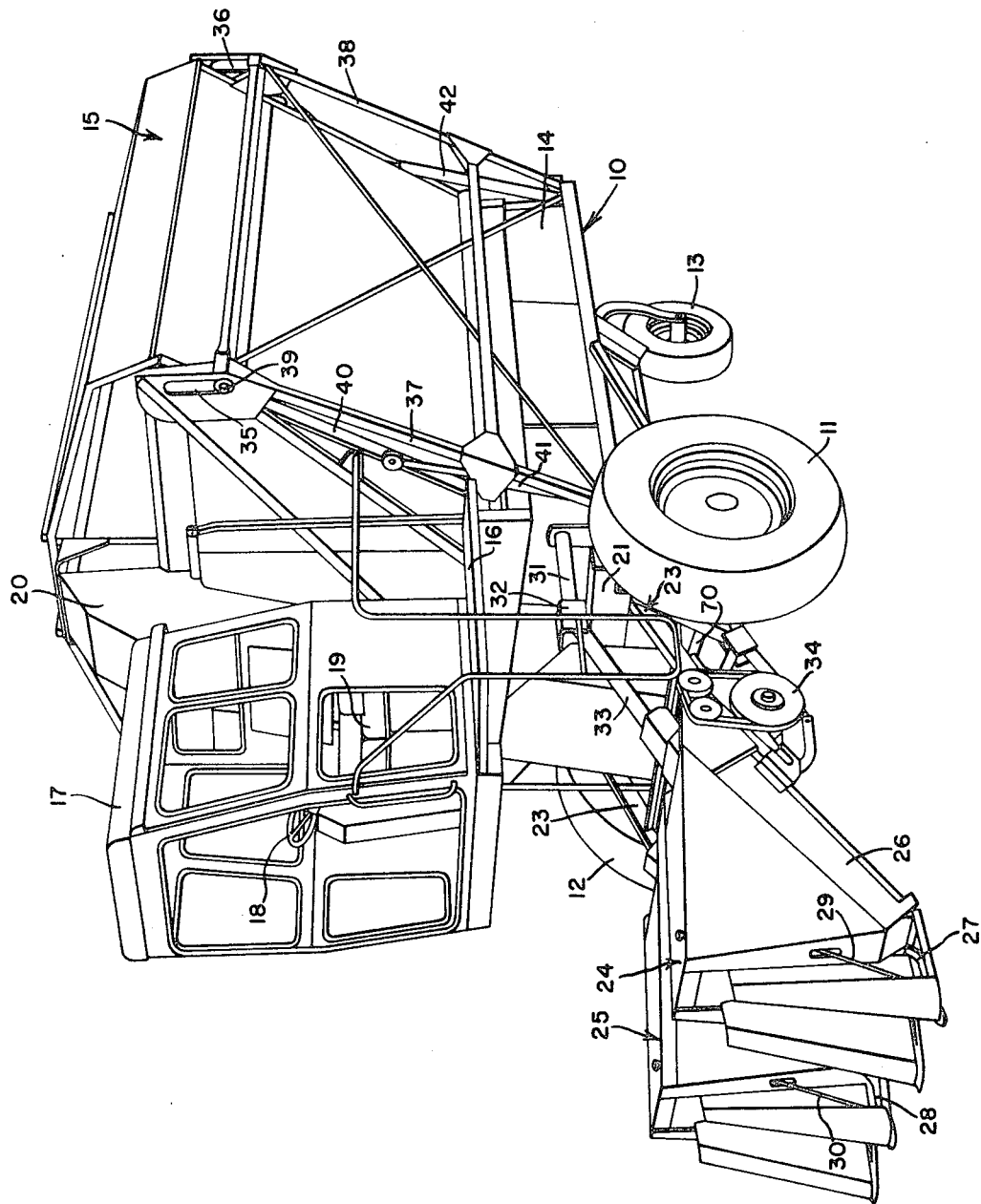
FIG. 1 is a front side perspective view of a cotton stripper utilizing features of the present invention.

Referring first to FIG. 1, the harvester includes a basic tractor or frame 10 having front traction wheels 11, 12 and a rear steerable wheel 13. The tractor has a main power source or engine 14 and carries a large material- or cotton-receiving basket 15 thereon. The basket 15 is positioned to receive ripe cotton bolls from the harvesting mechanism. Forward of the basket 15 is an operator's platform 16 that includes a cab 17, steering mechanism 18 and a seat 19. The platform 16 has a rear opening therein. The cab 17 is placed forwardly of the front wall of the basket 15 to permit passage of a large material conveying duct 20 that discharges ripe bolls into the basket 15. Extending between the front traction wheels 11, 12 is a main U-shaped frame structure that includes a horizontal section 21 and a pair of depending sections, one of which is shown at 22, having their lower ends connected to the respective wheels 11, 12. Mounted on and extending forwardly from the U-shaped frame structure 21 is supporting framework indicated in its entirety by the reference numeral 23 that supports a pair of row-harvesting units 24, 25 thereon. The row units 24, 25 operate to harvest both ripe and green cotton bolls from the plants and to transfer them rearwardly to the lower end of the duct 20. The harvesting units 24, 25 have main frames, indicated at 26. Ground shoes 27, 28 carried by the frames 26 engage the ground and through connecting rods 29, 30 operate suitable hydraulic valves for raising and lowering the units in accordance with the ground level. However, it should be recognized that exact details of the harvesting mechanism are not considered part of the present invention. Suitable drive mechanism such as a main drive shaft 31, a universal joint as indicated by a shield 32, and a connecting drive shaft 33 extends from the transmission of the engine 14 to the harvesting units 24, 25 and operates the harvesting mechanism therein. A belt drive 34 also operates part of the conveying mechanism which feeds the material into the base of the duct 20.

The basket 15 that receives the ripe cotton bolls is supported in upright slots 35, 36 formed in a pair of upright plates at opposite ends of the basket 15. The plates are parts of rigid upright frameworks, indicated in their entireties by reference numerals 37, 38. Extending through the slots 35, 36 is an elongated fore-and-aft extending pivot rod or shaft 39. The shaft or rod 39 may rise or fall in the slots 35, 36 and the upper ends of the slots 35, 36 serve as a fore-and-aft extending horizontal pivot on which the shaft 39 and the entire basket 15 may pivot for dumping ripe cotton bolls. The basket 15 is provided with suitable framework such as at 40 so as to rigidify the basket, and the entire basket is raised and tilted by a pair of vertically extending hydraulic cylinders 41, 42 positioned front and rear respectively of the forward and rear ends of the basket. In operation, the cylinders 41, 42 are extended to first raise the rod 39 to the top of the slots 35, 36 and upon further extension of the cylinders 41, 42 the entire basket tilts about the axis of the shaft. Tilting of the basket by this means is well known in the industry.

Figure 2:
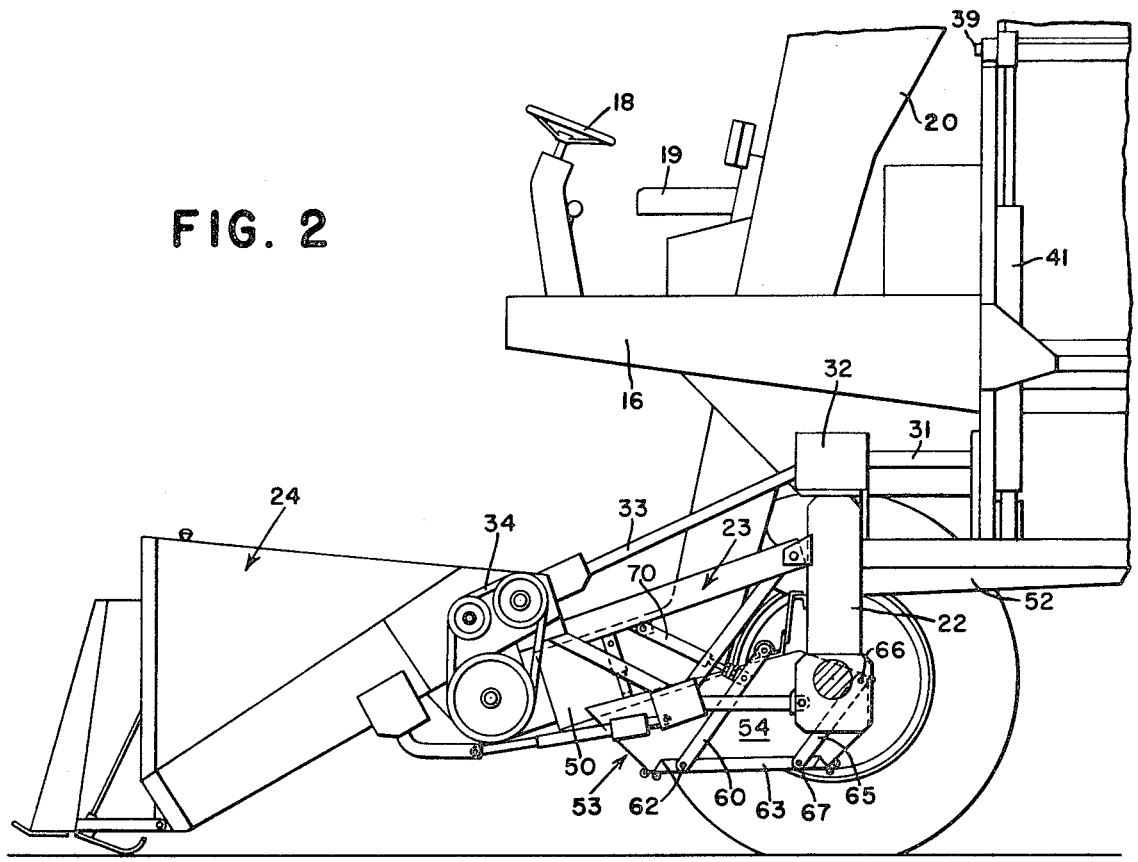
FIG. 2 is a side view of the forward portion of the cotton stripper with the cab being removed from the operator's platform and with portions of the stripper being removed to show structure between the two front wheels.
Figure 3:
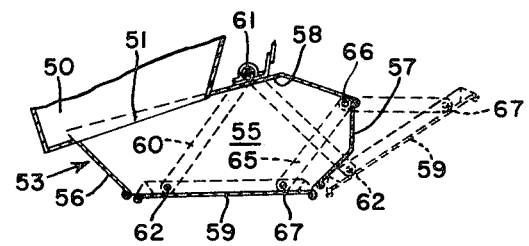
FIG. 3 is a fore-and-aft vertical sectional view taken through the lower portion of the cotton conveyor duct and the green-boll container.

Referring now to FIGS. 2 and 3, at the base of the duct 20 there is a forwardly projecting toe portion 50 that receives ripe and green bolls from the harvesting units 24, 25 through an impeller mechanism. In effect, the juncture between the lower toe 50 and the vertical duct portion 20 forms a heel that opens downwardly at 51 to provide an area into which heavier material may be discharged. Also connected to the vertical duct portion 20 is an air conduit or hose 52 that extends from a suitable blower and discharges air upwardly through the duct 20. This causes an induced air flow from the toe and opening 51 which gently raises the ripe cotton bolls from the green bolls and permits the green bolls to separate and gravitate into an awaiting green-boll container indicated in its entirety by the reference numeral 53. The green-boll container 53, as is evident from viewing FIG. 2, is out of the line of sight of an operator on platform 16. The green-boll container 53 is composed of left- and right-hand upright side panels 54, 55 that extend between a front vertically inclined wall 56 and a rear vertically inclined wall 57. A small overhead wall 58 also extends between the fore-and-aft extending panels 54, 55. The walls 56, 58 are fixed to the duct 20 at its heel portion so that material passing through the opening 51 will be received in the container 53. A closure member or floor 59 is provided at the bottom or base of the container 53. The floor 59 is supported on the container by means of a pair of front links 60 that extend downwardly from an upward pivot 61 carried on the wall 58 to a lower pivot 62 that is pivotally connected to vertical flanges 63 on the left- and right-hand edges of the panel 59. A pair of rear links 65 are provided on opposite sides of the container and have upper ends pivotally connected at 66 to an upper rear portion of their respective side panels 54, 55 and are pivotally connected at 67 to the respective flanges 63. Thus, the retractable floor 59 may swing from a closed position as shown in full line in FIG. 2 to a retracted or dumping position as shown in dotted line in FIG. 3.

A hydraulic cylinder 70 extends between the forward portion of the framework 23 and the link 60 on the left-hand side of the container box 63. The cylinder 70 operates to shift the retractable floor 59 to and from its retracted or open position.

Figure 4:
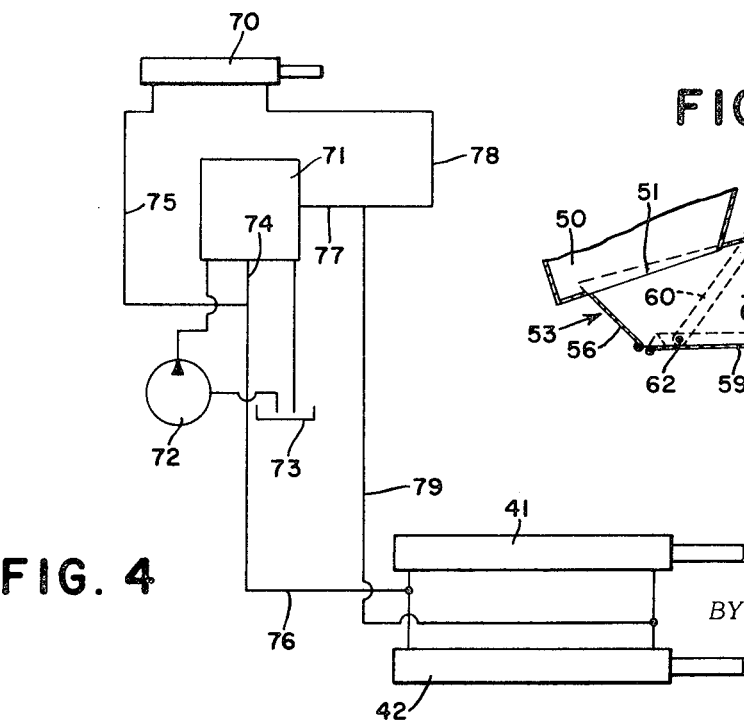
FIG. 4 is a schematic view of the hydraulic system utilized in the cotton stripper for dumping the green-boll container and the ripe-boll basket.

Referring to FIG. 4, the cylinders 41, 42 and 70 are connected in parallel in a hydraulic circuit controlled by a main valve 71. The valve 71 may be operated to move material through lines 74 and 77 and to the respective ends of the cylinders 70 and 41, 42. The cylinder 70 and cylinders 41, 42 operate in sequence, i.e., the cylinder with the least amount of load will operate first followed by the other cylinders. In the particular instance, there is less load required to retract the floor 59 than to move the basket 15. Consequently, the single control lever for the valve 71 will first move fluid into the cylinder 70 for purposes of retracting the floor 59 and will then move fluid into the cylinders 41, 42 for dumping the heavier basket 15. From a practical standpoint, an operator will always know that his green-boll container has been emptied when the basket is dumped into a wagon or other container. Since most dumping of the basket occurs at the end of the row and it is desired to also dump the green bolls adjacent the end of the row, this arrangement of hydraulic cylinders operates to great advantage since in effect the dumping of the green-boll container becomes automatic with the dumping of the ripe-boll basket. Since the green-boll container is hidden from the view of the operator, this latter feature is important. Also, when it is desired to dump only the green-boll container, the valve 71 may be operated until the basket 15 begins to tilt. At this time, the operator will know the green-boll container has been released and he may then use the valve to return the floor 59 to its closed position.

I claim:

1. In a cotton harvester in which cotton is removed from plants in a comingled mixture of ripe and green bolls, the green bolls are collected in a compartment having a retractable bottom, and the ripe bolls are collected in a basket supported to pivot on a horizontal axis, the improvement residing in: a first hydraulic motor connected to said retractable bottom for moving the bottom from a closure position with respect to the compartment for purposes of discharge; a second hydraulic motor connected to said basket for tilting the basket on its pivot for purposes of discharge; a fluid source and fluid reservoir; fluid line means including a valve connecting said first and second motors to said source and reservoir and in parallel to one another so that fluid moving from the source to the motors shall effect shifting first of the bottom from its closure position and then the basket to its tilted position.

2. In a cotton harvester in which cotton is removed from plants in a comingled mixture of ripe and green bolls, the green bolls are collected in a green-boll compartment, and the ripe bolls are collected in a basket, the improvement residing in: a first hydraulic motor connected to said green-boll compartment for adjusting the latter to and from the boll-dumping position, a second hydraulic motor connected to said basket for adjusting the basket to and from the boll-dumping position; a fluid source and fluid reservoir; fluid line means including a valve connecting said first and second motors to said source and reservoir and in parallel to one another so that fluid moving from the source to the motors shall effect shifting in sequence first the green-boll compartment to its dumping position and then the basket to its boll-dumping position.

3. The structure as set forth in claim 1 characterized by the green-boll container having a retractable floor that when retracted is in said boll-dumping position; and the basket is mounted to move vertically on a horizontal axis on one side of the basket.

4. In a cotton harvester having an operator's platform and in which cotton is removed from plants in a comingled mixture of ripe and green bolls, the green bolls are collected in a green-boll compartment hidden from view of an operator on the platform, and the ripe bolls are collected in a basket in view of the operator, the improvement residing in: a first hydraulic motor connected to said green-boll compartment for adjusting the latter to and from the boll-dumping position, a second hydraulic motor connected to said basket for adjusting the basket to and from the boll-dumping position; a fluid source and fluid reservoir; fluid line means including a valve connecting said first and second motors to said source and reservoir and in parallel to one another so that fluid moving from the source to the motors shall effect shifting in sequence first the green-boll compartment to its dumping position and then the basket to its boll-dumping position so that the operator may know the position of the green-boll compartment by viewing the basket.

* * * * *